Figure 1:
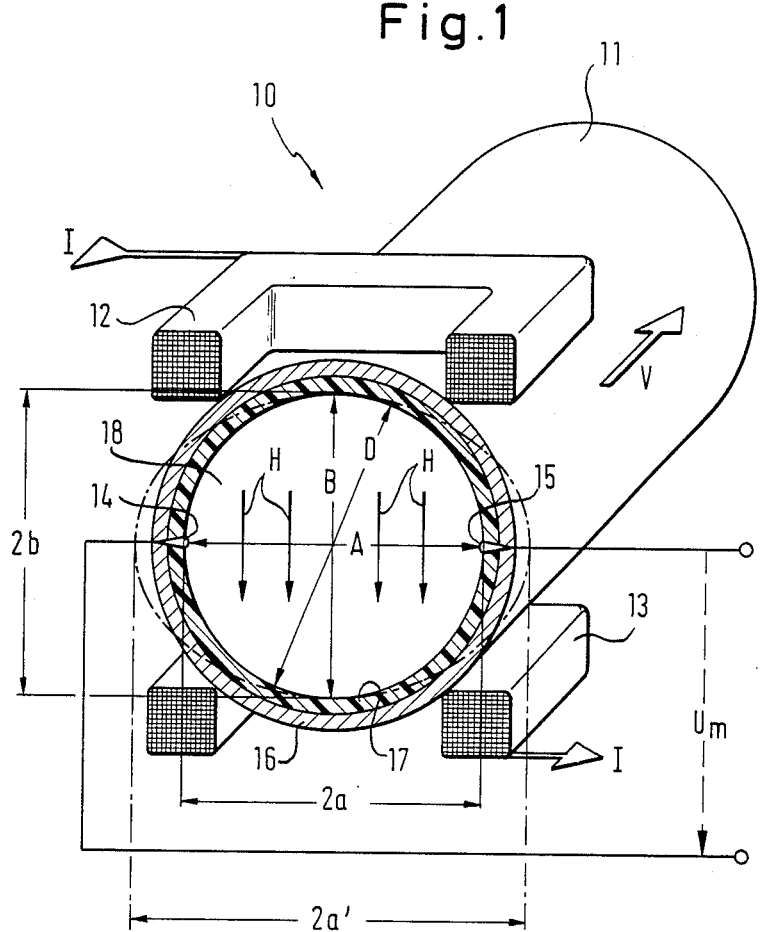

United States Patent [19]
Hafner

[11] Patent Number: 4,932,268
[45] Date of Patent: Jun. 12, 1990

[54] ELECTROMAGNETIC FLOW MEASURING ARRANGEMENT

[75] Inventor: Peter Hafner, Liestal, Switzerland

[73] Assignee: Flowtec AG, Reinach, Switzerland

[21] Appl. No.: 251,689

[22] Filed: Sep. 29, 1988

[30] Foreign Application Priority Data

Oct. 1, 1987 [DE] Fed. Rep. of Germany ....... 3733206

[51] Int. Cl.$^5$ ............................................. G01F 1/58
[52] U.S. Cl. .................................................. 73/861.12
[58] Field of Search ..................................... 73/861.12

[56] References Cited

U.S. PATENT DOCUMENTS

| | | |
|---|---|---|
| 2,896,451 | 7/1959 | Rinia . |
| 4,281,552 | 8/1981 | Nissen et al. . |
| 4,635,486 | 1/1987 | Jacobsen et al. . |
| 4,715,233 | 12/1987 | Neven et al. ...................... 73/861.12 |

FOREIGN PATENT DOCUMENTS

| | | |
|---|---|---|
| 1573007 | 6/1970 | Fed. Rep. of Germany . |
| 3420963 | 12/1985 | Fed. Rep. of Germany . |
| 811347 | 4/1959 | United Kingdom . |
| 1095915 | 12/1967 | United Kingdom ............. 73/861.12 |

*Primary Examiner*—Charles A. Ruehl
*Attorney, Agent, or Firm*—Barnes & Thornburg

[57] ABSTRACT

In an electromagnetic flow measuring arrangement an electrically conductive fluid flows through a measuring tube in which a magnetic field is generated transversely of the flow direction, whereby a voltage is induced which is proportional to the flow velocity. This voltage is tapped by means of two electrodes. The cavity of the measuring tube has an elliptical cross-section with two major axes, the first major axis coinciding with the connecting line of the two electrodes, and the second major axis coinciding with the direction of the magnetic field. The flow to be measured is proportional to the product of the measured flow velocity and the cross-section area of the cavity of the measuring tube. The flow measuring arrangement is constructed so that on changes of the cavity cross-section caused by external influences the cross-section retains substantially the profile of an ellipse and the length of the second major axis remains substantially constant. In this way external influences, such as pressure and temperature, that change the cross-section of the cavity of the measuring tube, do not affect the measuring result.

9 Claims, 4 Drawing Sheets

ELECTROMAGNETIC FLOW MEASURING ARRANGEMENT

The invention relates to an electromagnetic flow measuring arrangement comprising a measuring tube of which the cavity in cross-section has the profile of an ellipse having two major axes, a means for generating a magnetic field directed transversely of the flow direction and two electrodes arranged at points of the measuring tube opposite each other along the first major axis for tapping off the electrical voltage which is induced when the measuring tube is traversed by an electrically conductive medium.

In electromagnetic flow measuring arrangements of this type the flow measurement is based on the fact that the induced voltage tapped off with the aid of the electrodes is proportional to the induction of the magnetic field and to the mean flow velocity of the flow medium flowing through the measuring tube. The flow to be measured is derived from the product of the mean flow velocity and the cross-sectional area of the cavity of the measuring tube. The exact determination of the flow from the flow velocity measured with the aid of the induced voltage thus requires exact knowledge of the cross-sectional area. This requirement is no longer met when the cross-sectional area varies due to external influences. Such external influences are in particular the pressure and temperature of the flow medium flowing through the measuring tube. A change in the cross-sectional area of the measuring tube cavity also results as a rule in a change of the electrode spacing and this in turn changes the relationship between the induced voltage and the mean flow velocity to be measured. To obtain an exact measurement result complicated steps are therefore necessary to determine the changes of the cross-sectional area and compensate their influence on the measurement result.

The problem underlying the invention is to provide an electromagnetic flow measuring arrangement which with small expenditure furnishes exact measurement results which are independent of changes in shape of the cross-section of the measuring tube cavity caused by external influences.

This problem is solved according to the invention in that the cross-section of the cavity on changes in shape caused by external influences retains substantially an ellipse profile and that the length of the second major axis remains substantially constant.

The solution according to the invention is based on the recognition that in electromagnetic flow measurement with the aid of a measuring tube of elliptical cross-section the measurement result depends from the geometrical point of view only on the length of the ellipse major axis lying perpendicular to the electrode axis whilst the length of the other major axis, which corresponds at the same time to the electrode spacing, does not influence the measurement result. Since according to the invention on shape changes of the cavity cross-section the length of the major axis lying perpendicularly to the electrode axis is kept constant and at the same time it is ensured that the cavity cross-section retains an ellipse profile, such shape variations do not affect the measurement result.

The solution according to the invention also applies to the case where the cavity cross-section is circular because a circle is a special case of an ellipse having two major axes of the same length. The invention can thus be applied directly to the generally usual electromagnetic measuring arrangements having a circular measuring tube.

The invention can be implemented with low technical expenditure. It is merely necessary to stabilize the measuring tube at the two points which lie opposite each other along the ellipse major axis to be kept constant in such a manner that the length of said major axis cannot change. This can be done by structural members which engage the measuring tube at these points. A particularly favourable measure is to use for this purpose the components of the magnetic field generating means present in any case and possibly a housing which is present. By suitable choice of the materials from which these components are made it is possible to ensure that temperature-induced dimension changes of said components are compensated so that they do not impair the keeping constant of the ellipse major axis.

When the measuring tube is stabilized in this manner to keep the one ellipse major axis constant shape changes of the cavity cross-section generally occur in such a manner that an ellipse profile is retained without having to adopt special measures for this purpose. However, it is additionally possible by suitable formation of the measuring tube to influence the shape changes of the cavity cross-section to maintain an exact ellipse profile.

Figure 2:
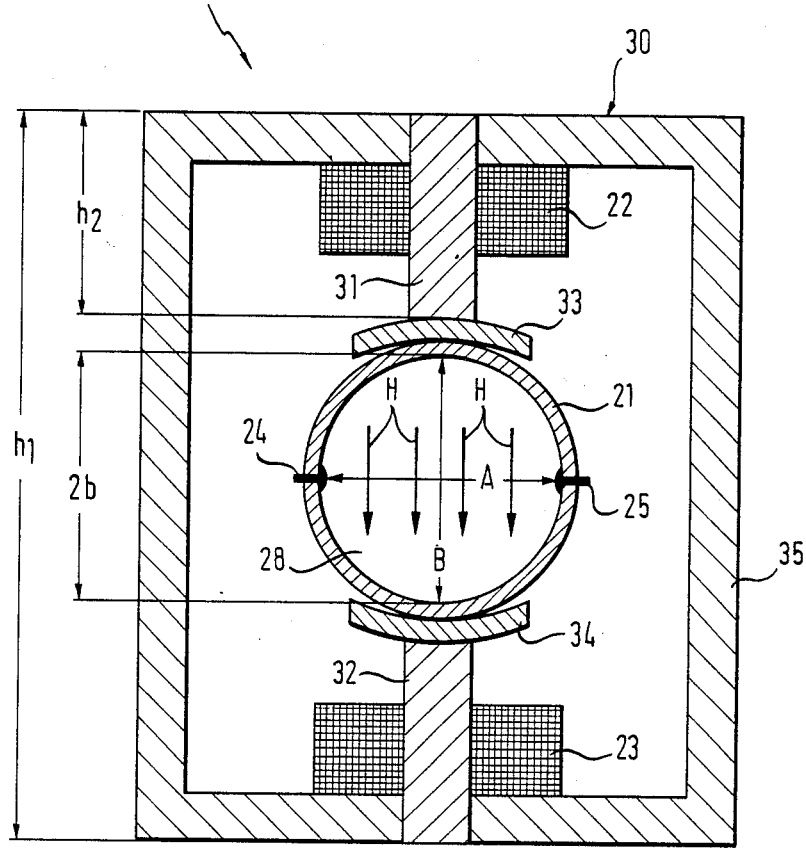
Figure 3:
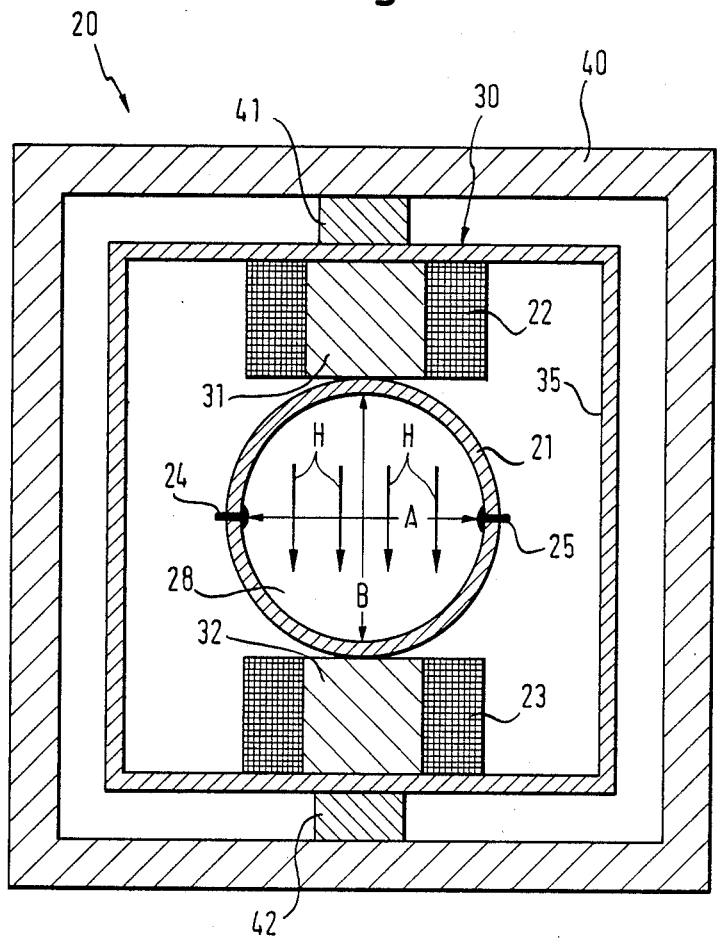
Figure 4:
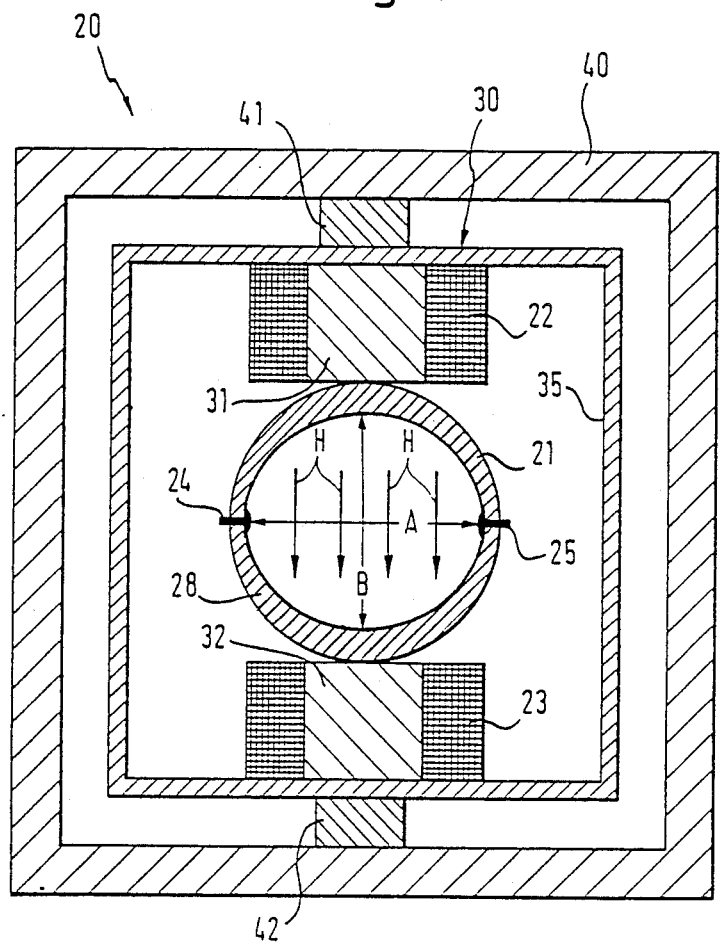

Further features and advantages of the invention will be apparent from the following description of examples of embodiment with the aid of the drawings, wherein:

FIG. 1 a schematic illustration of an electromagnetic flow measuring arrangement to explain the principle of the invention, FIG. 2 is a schematic sectional view of a first embodiment of the electromagnetic measuring arrangement according to the invention, FIG. 3 is a schematic sectional view of a second embodiment of the electromagnetic flow measuring arrangement according to the invention and FIG. 4 is a schematic sectional view of a modification of the electromagnetic flow measuring arrangement shown in FIG. 3.

FIG. 1 shows in a perspective sectional view an electromagnetic flow measuring arrangement 10 comprising a measuring tube 11. Two exciting coils 12, 13 traversed by a current I generate in the interior of the measuring tube 11 a magnetic field H which is directed perpendicularly to the axis of the measuring tube 11. Two electrodes 14, 15 which are disposed in the wall of the measuring tube 11 and the connecting line of which extends perpendicularly to the direction of the magnetic field H serve for tapping off a voltage $U_m$ which is induced when an electrically conductive medium flows through the measuring tube 11. In the example of embodiment illustrated the measuring tube 11 consists of a metallic outer jacket 16 which for electrical insulation from the electrically conductive flow medium is provided with an inner lining 17 of insulating material which consists for example of plastic. The plastic material is chosen such that its temperature-dependent expansion is in such a proportion to the temperature-dependent expansion of the metallic enclosure 16 that the inner lining 17 always bears everywhere on the inner wall of the metallic outer jacket 16. The inner surface of the inner lining 17 defines the cavity 18 of the measuring tube.

As illustrated, the electrodes 14, 15 may be in electrically conductive contact with the flow medium for galvanic signal tapping. They may however also be constructed as capacitive electrodes.

Of course, in an electromagnetic flow measuring arrangement of the type illustrated in FIG. 1 the voltage $U_m$ tapped from the electrodes 14 and 15 is proportional in accordance with Faraday's law of induction to the product of the induction $B_H$ of the magnetic field and the velocity v of the flow medium. The flow Q to be measured, i.e. the volume flowing through the measuring tube per unit time, is equal to the product of the velocity v and the cross-sectional area F of the cavity 18.

The measuring tube 11 has an elliptical cross-section with two major axes A, B of length 2a and 2b, respectively. The major axis A coincides with the line connecting the two electrodes 14 and 15, the distance apart of which is therefore equal to the length 2a of the major axis A. The major axis B, which is perpendicular to the major axis A, coincides with the direction of the magnetic field H.

Since the voltage tapped from the electrodes 14, 15 also depends on the electrode spacing the following relationship exists between the voltage $U_m$ and the velocity v of the flow medium:

$$U_m = K \cdot v \cdot B_H 2a \tag{1}$$

wherein K is a constant.

Since for the flow Q $$Q = v \cdot F \tag{2}$$

applies, the following relationship results between the voltage $U_m$ and the flow Q:

$$U_m = K \cdot \frac{Q}{F} \cdot B_H \cdot 2a \tag{3}$$

Due to external influences the cross-sectional area F can change during operation of the flow measuring arrangement. Such external influences are for example the pressure and temperature of the flow medium. A higher pressure of the flow medium can cause an expansion of the measuring tube 11 and temperature changes of the flow medium cause thermal expansions or contractions of the metallic outer jacket 16 and the inner lining 17. Due to these two causes the cross-sectional area F changes and thus the relationship between the induced voltage $U_m$ and the flow Q to be measured given by the formula (3).

With the ellipse profile of the cross-section of the cavity 18 assumed in FIG. 1 the following applies for the cross-sectional area thereof:

$$F = a \cdot b \cdot \pi \tag{4}$$

If the formula (4) is inserted into the formula (3) then the following relationship applies between the induced voltage $U_m$ and the flow Q:

$$U_m = 2K \cdot Q \cdot B_H \cdot \frac{1}{b \cdot \pi} \tag{5}$$

The voltage $U_m$ thus depends from the geometrical point of view only on the length 2b of the ellipse major axis B which extends perpendicularly to the line connecting the electrodes 14, 15 and parallel to the magnetic field H.

By suitable constructional steps, for which examples will be described later with reference to FIGS. 2 and 3, it is ensured that in the case of changes of the cross-sectional area F of the cavity 18 caused by pressure, temperature or other external influences:

the length 2b the second major axis B remains constant;
the cross-section of the cavity 18 retains substantially an ellipse profile.

In FIG. 1 in dot-dash line such a shape change of the cross-section of the cavity 18 is shown greatly exaggerated. The cavity cross-section further has the form of an ellipse, the first major axis A now having the length 2a' whilst the length 2b of the second major axis B has remained unchanged. The cross-sectional area $$F' = a' \cdot b \cdot \pi \tag{6}$$

is greater than the cross-sectional area F before the deformation but the electrodes 14 and 15 now also have a greater spacing than before the deformation. Consequently, the formula (5) applies unchanged to the relationship between the voltage $U_m$ and the flow Q. Consequently external influences such as pressure and temperature, which change the cross-section of the cavity 18 of the measuring tube 11, do not affect the measurement result.

The term "ellipse profile" includes the special case where the two major axes A and B of the ellipse have the same length; in this case the profile of the cavity cross-section is a circle of diameter D. This case is shown in FIG. 1 for the undeformed measuring tube 11. This corresponds to the usual configuration of electromagnetic flow measuring arrangements in which the measuring tube cavity is generally circular. In FIG. 1 the two major axes A and B have in the undeformed state of the measuring tube a length which is equal to the diameter D of the cavity 18. In the enlargement of the cavity cross-section illustrated in dot-dash line the length 2b of the major axis B is still equal to the diameter D whilst the length 2a' of the major axis A is greater than the diameter D.

It is possible by a very simple constructional step to constrain the length of the one major axis to remain unchanged: the measuring tube is stabilized at two points lying diametrically opposite each other along the major axis B to be kept constant by members engaging said measuring tube in such a manner that any change of length of said major axis is prevented. Any change of the cavity cross-section necessarily effects a deformation which results in a change of length of the other major axis A. With uniform wall thickness of the measuring tube the deformation is at least approximately elliptical even without adopting special measures.

FIG. 2 shows a sectional view through an electromagnetic flow measuring arrangement 20 which is constructed in the manner explained above. In the same manner as the flow measuring arrangement 10 of FIG. 1 the flow measuring arrangement here comprises a measuring tube 21, two exciting coils 22, 23 for generating a magnetic field H in the interior of the measuring tube and two electrodes 24, 25 for tapping off the induced voltage. The cross-section of the cavity 28 of the measuring tube 21 again has an elliptical profile with two major axes A and B which in the undeformed state illustrated are of equal size which means that the undeformed cross-section is circular.

The two exciting coils 22, 23 are parts of a magnetic field generating means 30 which also comprises two magnetic cores 31, 32 surrounded by the exciting coils 22, 23, two pole shoes 33, 34 disposed at the end sides of the magnetic cores 31, 32 and a yoke member 35 connecting the two magnetic cores 31, 32 together. The yoke member 35 forms with the magnetic cores 31, 32 the magnetic circuit of the magnetic field generating means 30.

The pole shoes 33 and 34 are curved and partially surround the measuring tube 21, the radius of curvature of the pole shoes 33, 34 being somewhat greater than the radius of curvature of the measuring tube 21. It is thereby possible to achieve that the magnetic field H generated in the cavity 28 of the measuring tube 21 is substantially homogeneous. The pole shoes 33, 34 bear on diametrically opposite points in the extension of the major axis B at the outer side of the measuring tube 21. Since the pole shoes 33, 34 are held at a definite distance apart by the magnetic cores 31, 32 and the yoke member 35, said structural parts enforce a defined length of the major axis B of the cross-sectional profile of the cavity 28.

On enlargement of the cross-sectional area of the cavity 18 due to pressure changes the structural parts 31, 32, 33, 34, 35 remain unchanged so that the length $2b$ of the major axis B cannot change either. The measuring tube 21 must therefore deform in the direction of the major axis A, the length of said major axis A increasing.

If however a temperature change is the cause of the change of the cross-sectional area of the cavity 28 said temperature change also affects the structural parts which are to keep the length of the major axis B constant. This applies both on a change of the ambient temperature and on a change of the temperature of the flow medium flowing through the measuring tube because the temperature of said medium is also transmitted to the components of the magnetic circuit. As a result the dimensions of the components of the magnetic circuit change in accordance with their coefficients of thermal expansion. In the flow measurement of very hot flow media the changes of the cross-sectional area of the cavity 28 as well as the length changes of the magnetic circuit components can be considerable.

By suitable choice of the materials of which the components of the magnetic circuit consist the temperature-induced influences can however be compensated in such a manner that the length $2b$ of the major axis B remains constant. For this purpose the materials of the components of the magnetic circuit are selected so that the following relationship holds:

$$\tfrac{1}{2} \cdot h_1(1 + T \cdot k_1) - h_2(1 + T \cdot k_2) = b = \text{constant} \quad (7)$$

wherein:

$h_1$: is the height of the yoke member 35 parallel to the major axis B;
$h_2$: is the height of one of the magnetic cores 31, 32;
$k_1$: is the coefficient of thermal expansion of the material of the yoke member 35;
$k_2$: is the coefficient of thermal expansion of the material of the magnetic cores 31 and 32;
T: is the temperature.

The thicknesses of the wall of the measuring tube 21 and of the pole shoes 33, 34 are neglected for simplification. The following equation then applies for the half length b of the major axis B:

$$b = \tfrac{1}{2} \cdot h_1 - h_2 \quad (8)$$

The following condition then follows from equations (7) and (8) for the thermal coefficients of expansion of the materials of the magnetic circuit components:

$$\frac{k_1}{k_2} = 2 \cdot \frac{h_2}{h_1} \quad (9)$$

If this condition is fulfilled the distance between the pole shoes 33 and 34 and thus the length $2b$ of the major axis B remains constant independent of temperature changes. Consequently, by suitable matching of the geometry and materials of the components of the magnetic field generating means 30 it is fundamentally possible to keep constant the length of the major axis B of the ellipse profile of the cavity 28 lying perpendicularly to the electrode axis even on temperature-induced cross-sectional variations.

In order for the compensation described of the temperature-induced dimension changes of the components of the magnetic circuit to be effected good thermal coupling of said components to the measuring tube or to the flow medium flowing through said tube is necessary so that the temperature of said components assume as quickly as possible the temperature of the measuring tube or of the flow medium. In FIG. 2 the thermal coupling is mainly via the pole shoes 33 and 34 bearing on the measuring tube 21, the heat being propagated via the magnetic cores 31 and 32 into the yoke member 35. If this coupling is not adequate additional heat-conducting bridges can be provided which consist for example of potting composition or metal and effect a direct heat transfer from the measuring tube 21 to the yoke member 35. In addition, between the yoke member 35 and a housing surrounding the arrangement a thermal insulation may be provided to keep the temperature of the components of the magnetic circuit at the optimum value.

FIG. 3 shows a modified embodiment of the electromagnetic flow measuring arrangement 20 of FIG. 2, the components corresponding to those of FIG. 2 being denoted by the same reference numerals as in FIG. 2 and not being described again. The embodiment of FIG. 3 differs from that of FIG. 2 in the following:

The pole shoes 33, 34 are omitted; instead of them the magnetic cores 31, 32 bear with their end faces directly on the outer side of the measuring tube 21.

The measuring tube 21 and the magnetic field generating means 30 are surrounded by a housing 40 and are fixedly attached to the latter by support elements 41, 42 which extend in the extension of the major axis B between the yoke member 35 and the housing 40.

The yoke member 35 is made weaker than in the embodiment of FIG. 2 so that its strength would not be sufficient to prevent a deformation of the measuring tube 21 in the direction of the major axis B; however, in this case the housing 40 forms the structural member which stabilizes the measuring tube 21 via the magnetic cores 31 and 32 at the points lying opposite each other in the extension of the major axis B. To ensure that the major axis B is also kept constant in the case of temperature-induced changes of the cross-sectional area in this case the material of the housing 40 must be selected with respect to the materials of the support elements 41, 42 and of the magnetic cores 31, 32 so that the condition of formula (9) is met.

The embodiments shown in FIGS. 2 and 3 have the advantage that for keeping the major axis B constant only components of the flow measuring arrangement are used which are present in any case so that for this purpose no additional structural members are required. This is of course not absolutely essential. In many cases it may be expedient to provide additional structural members for stabilizing the measuring tube in the direction of the major axis B. Such members could for example engage the measuring tube on both sides of the magnetic cores 31, 32 or of the pole shoes 33, 34. Such modifications do not present the expert with any difficulties and are therefore not illustrated.

As already mentioned, the stabilizing described of the major axis B in measuring tubes of uniform wall thickness itself generally results in a substantially elliptical deformation of the cross-sectional profile as illustrated in FIG. 1. If in particular cases the resulting cross-sectional profile does not correspond exactly enough to the ellipse form the change of shape can be improved by suitable constructional configuration of the measuring tube. One measure suitable for doing this resides in forming the wall of the measuring tube with locally different thickness, the greatest thickness being provided in the extension of the major axis B, i.e. in the region of the pole shoes or magnet cores, and the smallest thickness being provided in the extension of the major axis A, i.e. in the region of the electrodes as shown in FIG. 4. Instead of making the wall thickness different it is also possible to provide the wall of the measuring tube with a reinforcement in the region of the pole shoes or magnet cores. All these steps serve the purpose of promoting a deformation of the cavity cross-section in the direction of the major axis A.

I claim:

1. An electromagnetic flow measuring arrangement comprising a measuring tube of which the cavity in cross-section has the profile of an ellipse having a first and a second major axis and a first cross-sectional area, means for generating a magnetic field directed transversely of the flow direction, two electrodes arranged at points of the measuring tube opposite each other along the first major axis for tapping off an electrical voltage which is induced when the measuring tube is traversed by an electrically conductive medium and which is proportional to the flow through the measuring tube, and structural members supporting the measuring tube at points which lie opposite each other along the second major axis, said structural members having sufficient strength to keep the length of the second major axis constant when the cross-sectional area of the cavity of the measuring tube is changed by external influences, said measuring tube maintaining substantially an ellipse profile on such changes of said cross-sectional area so that changes in cross-sectional area will not change the proportionality between the induced voltage and the flow.

2. A flow measuring arrangement according to claim 1, wherein magnetic cores and a magnetic yoke member of the means for generating the magnetic field are among the members keeping the length of the second major axis constant.

3. A flow measuring arrangement according to claim 2, wherein the means for generating the magnetic field comprises two magnetic cores which bear on the outer side of the measuring tube at points lying diametrically opposite each other along the second major axis and thereby keep the length of the second major axis substantially constant on shape changes of the measuring tube.

4. A flow measuring arrangement according to claim 3, wherein the magnetic cores are provided with pole shoes which bear on the outer side of the measuring tube.

5. A flow measuring arrangement according to claim 4, wherein the pole shoes have a greater radius of curvature than the measuring tube.

6. A flow measuring arrangement according to claim 1, wherein said structural members include a housing surrounding the measuring tube and the field generating means 7. A flow measuring arrangement according to claim 1, wherein the wall of the measuring tube has areas of different thickness.

8. An electromagnetic flow measuring arrangement comprising a measuring tube of which the cavity in cross-section has the profile of an ellipse having a first and a second major axis, means for generating a magnetic field directed transversely of the flow direction, two electrodes arranged at points of the measuring tube opposite each other along the first major axis for tapping off the electrical voltage which is induced when the measuring tube is traversed by an electrically conductive medium, and structural members supporting the measuring tube at points which lie opposite each other along the second major axis, said structural members keeping the length of the second major axis constant when the cross-sectional area of the cavity of the measuring tube is changed by external influences, said measuring tube maintaining substantially an ellipse profile on such changes of such cross-sectional area, the structural members being formed from different materials having thermal coefficients of expansion which are adapted to each other in such a manner that the temperature-induced shape changes of the measuring tube do not lead to any change in length of the second major axis.

9. A flow measuring arrangement according to claim 8, wherein the members keeping the length of the second major axis constant are thermally coupled to the measuring tube or to the medium flowing through the measuring tube in such a manner that temperature-induced shape changes of the measuring tube do not lead to any change in length of the second major axis.

* * * * *